United States Patent
Scofield et al.

(10) Patent No.: US 10,432,816 B1
(45) Date of Patent: Oct. 1, 2019

(54) FINISHING LINE CONTROLLERS TO OPTIMIZE THE INITIALIZATION OF A PRINTING DEVICE

(71) Applicant: HEWLETT-PACKARD DEVELOPMENT COMPANY, L.P., Houston, TX (US)

(72) Inventors: Stuart Scofield, Vancouver, WA (US); Robert Yraceburu, Vancouver, WA (US); Bruce G. Johnson, Vancouver, WA (US); Bartley Helms, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/104,690

(22) Filed: Aug. 17, 2018

(51) Int. Cl.
  *G06F 3/12* (2006.01)
  *H04N 1/00* (2006.01)

(52) U.S. Cl.
  CPC ....... *H04N 1/00928* (2013.01); *H04N 1/0097* (2013.01)

(58) Field of Classification Search
  CPC .... H04N 1/00928; H04N 1/0097; H02P 9/18; H03M 2201/128; G05B 19/251; G05B 19/291; G05B 19/311; G05B 19/351; G05B 19/371
  See application file for complete search history.

(56) References Cited

U.S. PATENT DOCUMENTS

| | | | |
|---|---|---|---|
| 6,594,028 B1 * | 7/2003 | Hamamoto | G06F 3/1204 347/14 |
| 6,693,717 B1 * | 2/2004 | Teradaira | G06K 15/00 358/1.13 |
| 7,295,786 B2 | 11/2007 | Brinsley | |
| 9,043,630 B2 | 5/2015 | Park | |
| 9,367,333 B2 | 6/2016 | Wen et al. | |
| 2001/0007415 A1 * | 7/2001 | Takemoto | G03G 15/5008 318/560 |
| 2004/0119778 A1 * | 6/2004 | Naito | B41J 19/202 347/37 |
| 2014/0320560 A1 * | 10/2014 | Verdugo | B41J 19/202 347/9 |
| 2017/0180582 A1 * | 6/2017 | Kodama | H04N 1/00891 |

FOREIGN PATENT DOCUMENTS

| | | |
|---|---|---|
| CN | 105564028 B | 7/2017 |
| JP | 2008216527 A | 9/2008 |
| JP | 5720086 B2 | 5/2015 |

* cited by examiner

*Primary Examiner* — Moustapha Diaby
(74) *Attorney, Agent, or Firm* — Perry + Currier Inc.

(57) ABSTRACT

An example apparatus includes a non-transitory computer-readable medium with instructions stored thereon to perform apparatus component initialization sequences. The apparatus component initialization sequences include a full initialization sequence and a short initialization sequence, A processor is to execute the instructions to capture apparatus component state information, determine upon reception of a signal indicative of power on of the apparatus whether a position of an apparatus component is within a threshold of an expected position, perform the short initialization sequence if the position of the apparatus component is within the threshold and using the captured apparatus component state information.

15 Claims, 9 Drawing Sheets

FINISHING LINE CONTROLLERS TO OPTIMIZE THE INITIALIZATION OF A PRINTING DEVICE

BACKGROUND

Imaging systems, such as printers, utilize hardware initialization sequences to ready the various working components of the printer for the next printing job. Furthermore, some printers may power down certain components and/or functions to enter low-power states, such as sleep states.

DETAILED DESCRIPTION

Various examples provide an apparatus or print device, such as a printer, that determines an initialization sequence of components of the apparatus. Apparatus components may include servos and mechanisms connected to the servos. An apparatus may select an initialization sequence to reduce a time to bring the apparatus from a partial power down state, such as a sleep state, to a power on state that is ready to process print media. In addition, noise caused by apparatus components transitioning state may be reduced based on the initialization sequence selected.

Example apparatuses include printers (e.g., inkjet printers) that print to flat media (e.g., paper), 3D printers that create 3D objects, finishers, accessories, and similar. Function and structure of such example apparatuses may overlap in a particular apparatus. For example, a printer may include a finisher. Examples of print media include a sheet or stack of paper, 3D printing material (e.g., thermoplastics, powder, etc.), plastic film, card stock, and similar.

An apparatus component may serve to convey print media along a path. An apparatus component may physically manipulate the print media. A servo or other type of actuator may be integrated within an apparatus component. An apparatus component may be referred to as a movable component. Example apparatus components include print media conveyance mechanisms (e.g., rollers, pullers, belts, etc.), printheads, input/output trays, print media clamps, print media supports to receive printed media (e.g., mezzanines), staplers, cutters, media folding mechanisms, media binding mechanisms, and the like.

Examples of operations that may be performed by a finisher include stapling, offsetting, collating, binding, stamping, embossing, coating, laminating, cutting, folding, and the like. An apparatus component may be positioned along a print media path through a finisher to perform a finishing operation. Any number of apparatus components may be provided to perform any number of finishing operations. Multiple print media paths may be provided, and a particular finishing operation or set of finishing operations may use a particular path.

Figure 1:
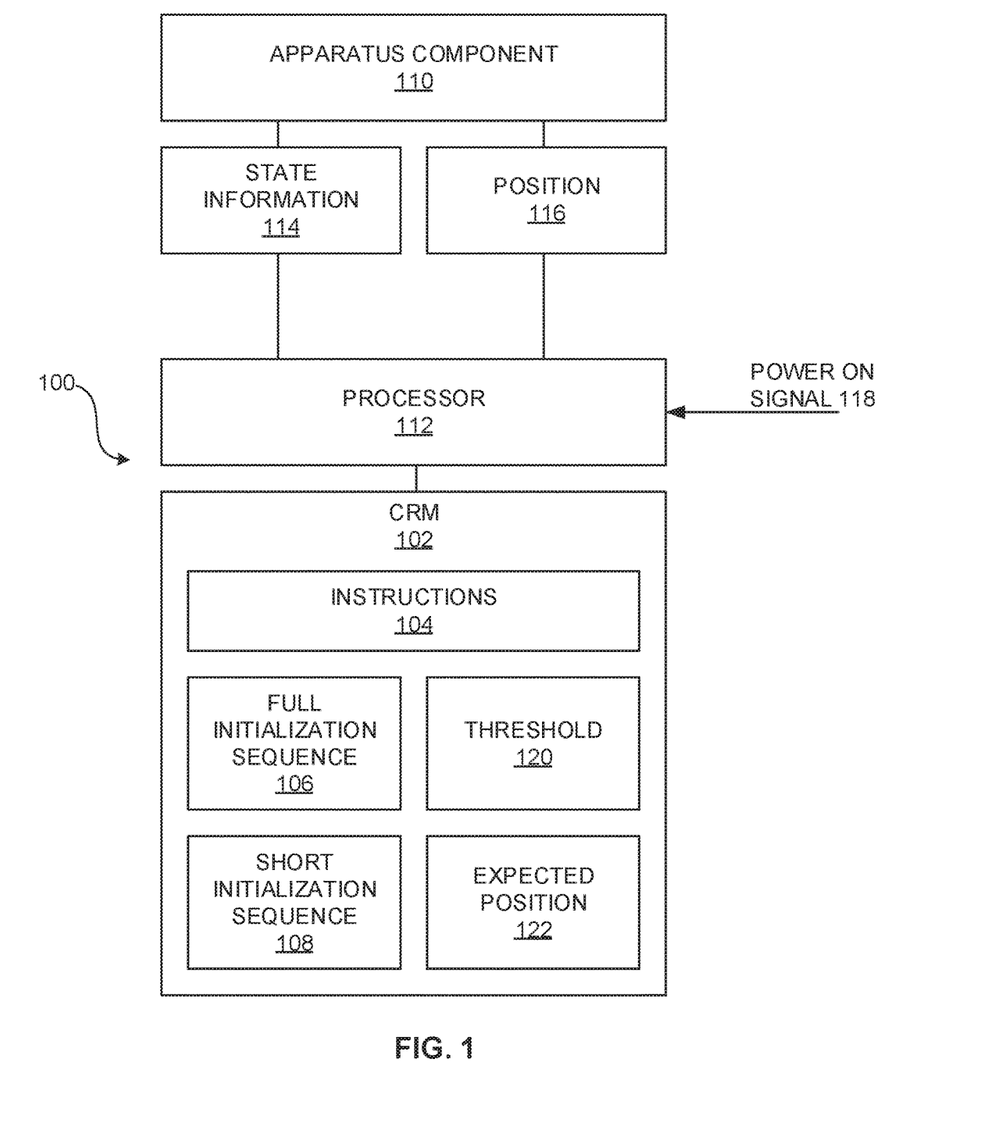
FIG. 1 is a block diagram of an example apparatus to select an initialization sequence.

FIG. 1 shows an example apparatus 100 that may be provided to a printer, finisher, or similar print device.

The apparatus 100 includes a non-transitory computer-readable medium 102 with instructions 104 stored thereon. The computer-readable medium 102 may be any electronic, magnetic, optical, or other physical storage device that stores executable instructions. The computer-readable medium 102 may include, for example, random access memory (RAM), read-only memory (ROM), electrically-erasable programmable (EEPROM), flash memory, a storage drive, an optical disc, or the like. The computer-readable medium 102 includes a portion that is non-volatile or is entirely non-volatile, so that information concerning a component of the apparatus 100 may be stored.

The instructions 104 are to initiate apparatus component initialization sequences 106, 108. The apparatus component initialization sequences 106, 108 include a full initialization sequence 106 and a short initialization sequence 108. The full initialization sequence 106 may include performing a calibration for the apparatus component, initializing an operational variable, moving an apparatus component with respect to another apparatus component (e.g., to disentangle components that a user may have inadvertently entangled), clearing print media from an apparatus component, and similar. The short initialization sequence 108 may omit a portion of the full initialization sequence 106 and may instead verify a position of an apparatus component and use stored information, such as a calibration, for that component if verification is successful. If verification fails, then the short initialization sequence 108 may be stopped and the full initialization sequence 106 may be initiated.

In some examples, the initialization sequences 106, 108 may be separately defined, such that each sequence includes a complete definition. In other examples, the initialization sequences 106, 108 may be defined by logical branches within the same master sequence, such that each sequence is defined in terms of conditions that result in particular branches being followed.

The instructions 104 may select and execute an apparatus component initialization sequence 106, 108 based on a position of an apparatus component 110 that is connected to or forms part of the apparatus 100. For example, when the apparatus 100 is put into a partial power down state, the apparatus 100 may store a position of the apparatus component 110. Then, when the apparatus 100 is woken from the partial power down state, the apparatus 100 may compare a current position of the apparatus component 110 with the stored position to determine whether an unexpected change in position has occurred. An unexpected change in position may arise from a user of the apparatus 100 manually changing the position of the apparatus component 110 during the partial power down state. For example, the user may wish to inspect or clean the apparatus 100, move the apparatus 100 to a new location, add or remove an accessory to the apparatus 100, and the like. If the current position of the apparatus component 110 corresponds to the stored position, then the apparatus 100 determines that an unexpected change in position has not occurred and that the short initialization sequence 108 may be used to save time or reduce noise emission. Otherwise the full initialization sequence 106 may be used. The short initialization sequence 108 and the full initialization sequence 106 are described in greater detail below.

The term position may include a linear position, an angular position, an orientation, a distance or angle between two positions, a gap, a position of a print medium along a path, the presence or absence of a component at a particular location, and similar. A position may be represented by a signal, such as a voltage, current, and the like. A position may be stored and processed as a signal or other positional information.

Any number and type of apparatus components 110 may be provided to the apparatus 100.

The apparatus 100 further includes a processor 112 to execute the instructions 104. The processor 112 cooperates with the computer-readable medium 102 and may include a central processing unit (CPU), a microcontroller, a microprocessor, a processing core, a field-programmable gate array (FPGA), or similar device capable of executing instructions.

The instructions 104 capture state information 114 of the apparatus component 110. State information 114 may include information corresponding a servo (also termed servomotor or actuator) and a mechanism connected to the servo of the apparatus component 110. A mechanism may be movable between a plurality of positions as enabled by a respective servo. Examples of such mechanisms are described above and elsewhere herein.

A sensor may be used to capture information about a servo or its connected mechanism. A servo may include an integrated sensor. A servo may continually sense and record position during operation.

The captured apparatus component state information 114 may correspond to a position of a servo, a position of a mechanism, or a combination thereof, which may be referred to as a position 116 of the apparatus component 110. State information 114 may be captured regularly while the apparatus 100 is in use. State information 114 is captured before the apparatus 100 is placed into a partial power down state. For example, instructions related to transitioning power state may include instructions to capture and store state information 114 of the apparatus component 110. State information 114 may also include calibration data, operational variables, and the like.

The instructions 104 are further to, upon reception of a signal 118 indicative of power on of the apparatus 100, determine whether the actual position 116 of the apparatus component 110 is within a threshold 120 of an expected position 122. The expected position 122 may be obtained from state information 114 captured before partial power down and the actual position 116 may be obtained from state information 114 captured after power on. A difference between the actual position 116 and expected position 122 may represent an unexpected change in position of the apparatus component 110 experienced during partial power down.

A threshold 120 may define a bound. For example, if the expected position is 5 mm from a stop position, then the threshold may be 6 mm, so that an actual position 116 that deviates from the expected position 122 by more than 1 mm is considered to exceed the threshold 120. A threshold 120 may define multiple bounds, so that a position outside a range of positions defined by the bounds is considered to exceed the threshold. Another example threshold 120 is the presence of the apparatus component 110 at a particular location. The threshold 120 may be considered exceeded when the apparatus component 110 is not detected at the particular location.

To compare the actual position 116 to the expected position 122, the instructions may cause the apparatus component 110 to move. Such movement may be slight and may be an amount sufficient to evaluate the position 116 of the apparatus component 110.

The processor 112 performs the short initialization sequence 108 if the position 116 of the apparatus component 110 is within the threshold 120. As such, the position 116 of the apparatus component 110 may be used to verify that a user of the apparatus 100 has not manually interfered with the apparatus component 110, or verify that some other disruptive event has not occurred, and that it is unnecessary to reestablish a calibration, operational variable, or other state information 114 via the full initialization sequence 106. Thus, the short initialization sequence 108 may be used to save time and reduce mechanical noise when initializing the apparatus 100.

The processor 112 performs the full initialization sequence 106 upon a determination that the signal 118 indicative of power on of the apparatus 100 corresponds to a signal indicative of power on from a full power down state of the apparatus 100. As power to the apparatus 100 was removed, for example by a user switching the power off or unplugging the apparatus 100, a position of the apparatus component 110 may be subject to greater uncertainty and the use of a past calibration, operational variable, or other state information 114 may be precluded. The processor 112 may perform the full initialization sequence 106 when there is a failure to verify a position of an apparatus component 110 during the short initialization sequence 108. Further, the processor 112 may perform the full initialization sequence 106 after user intervention to clear jammed print media, as user intervention may increase the likelihood that an apparatus component 110, such as a media support, has been moved into an unexpected position. However, the foregoing are merely illustrative examples and are not to be taken in a limiting sense.

Figure 2:
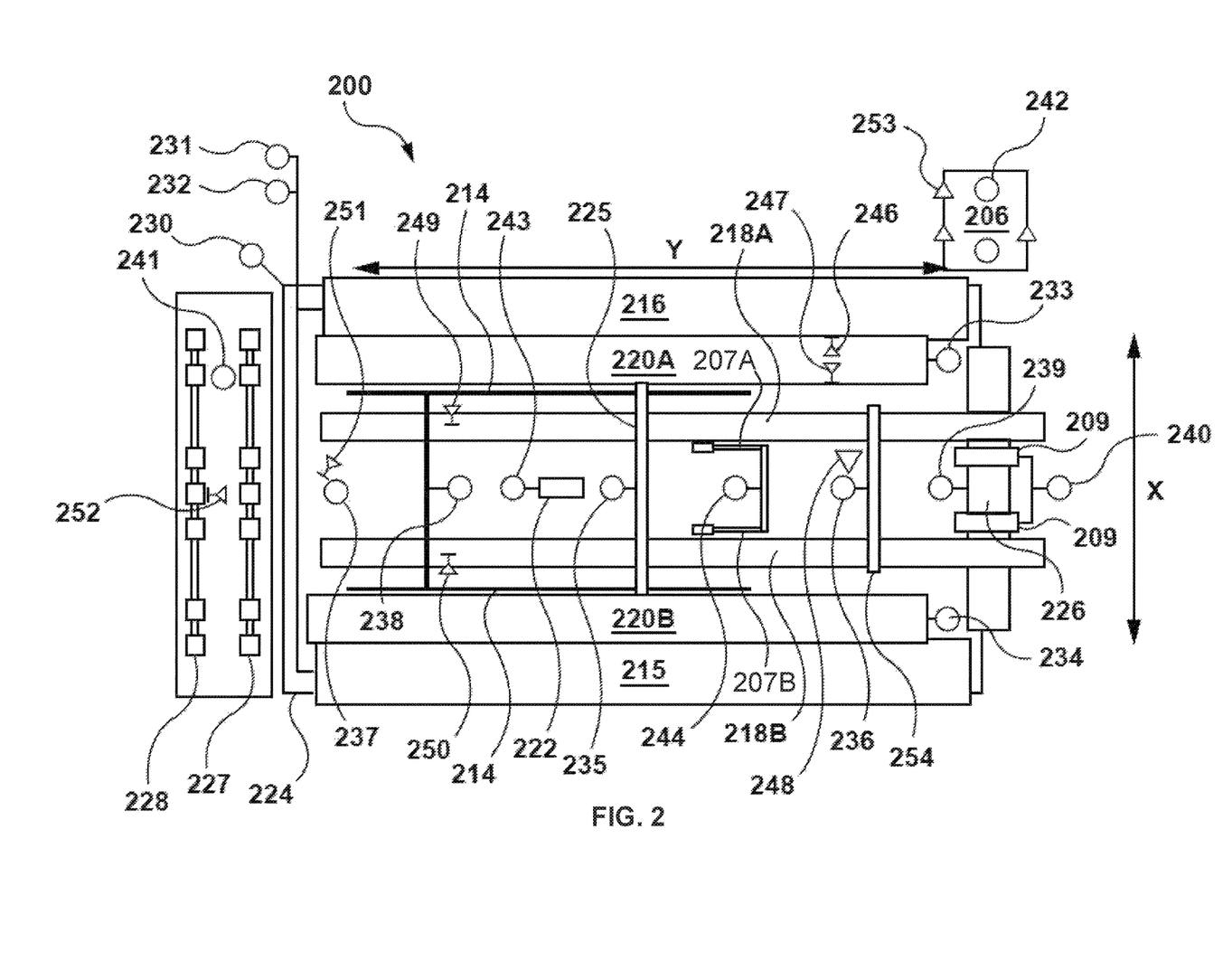
FIG. 2 is a schematic top view of an example finisher to select an initialization sequence.
Figure 3:
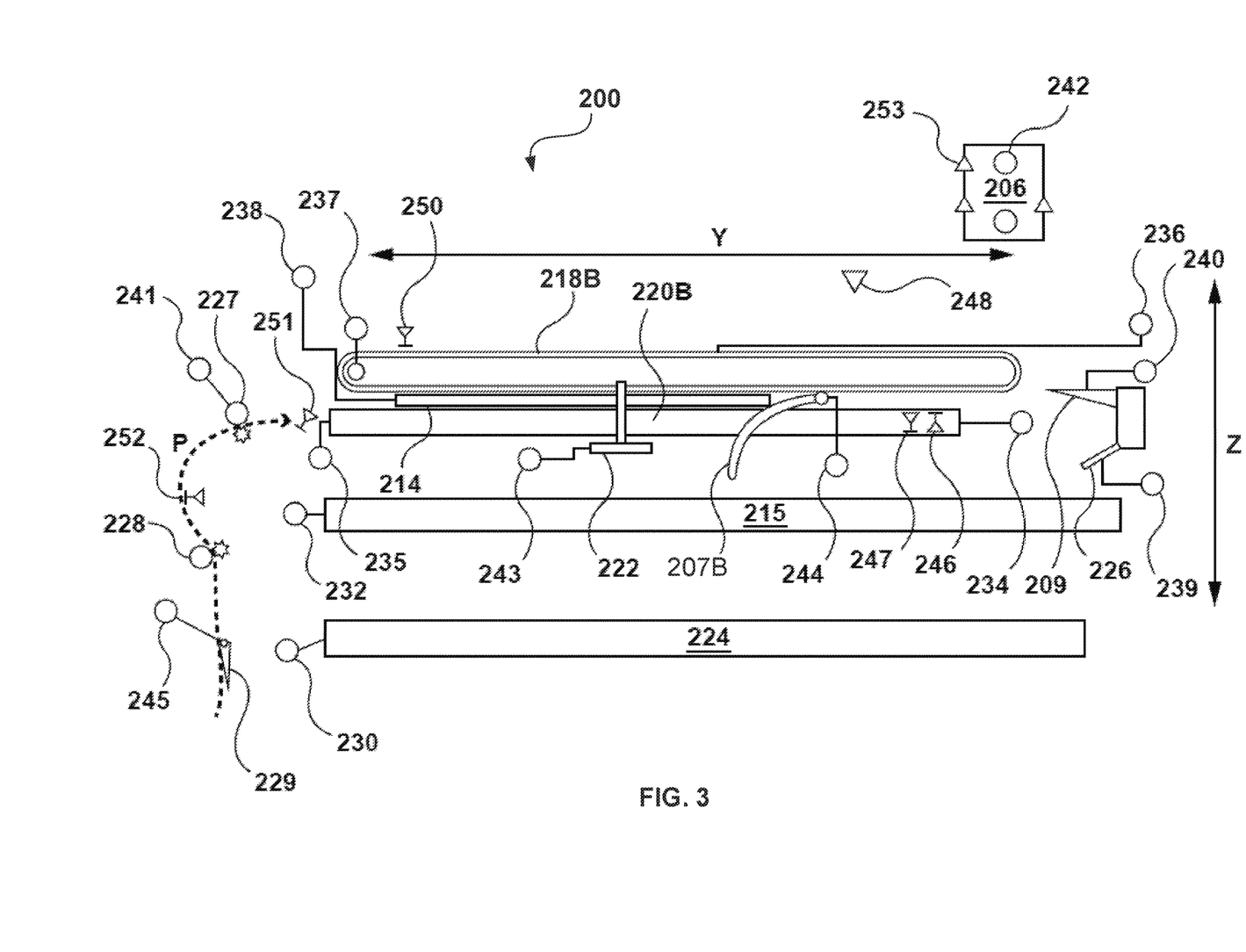
FIG. 3 is a schematic side view of an example finisher to select an initialization sequence.

FIGS. 2 and 3 show an example finisher 200. The finisher 200 is an example of an apparatus that may have an initialization sequence selected. A processor used to control the finisher may be termed a finishing line controller.

The finisher 200 may include apparatus components such as a floor 224, a rear mezzanine 216, a front mezzanine 215, a rear media-guide channel 220A, a front media-guide channel 220B (collectively, media-guide channels 220), a channel lift mechanism 225, a rear puller 218A, a front puller 218B (collectively, pullers 218), an X-axis registration mechanism 254, bar clamps 214 (also termed edge clamps), a shelf 226, leading-edge clamps 209, eject pinch rollers 227, spur pinch rollers 228, a stapler 206, a mid-page clamp 222, trailing-edge clamps 207A, 207B (collectively, trailing-edge clamps 207), a diverter 229, and similar. The pullers 218 may be attached to a belt to provide for movement of a print medium.

The finisher 200 may further include servos, also termed servomotors, to actuate the components. The finisher 200 may include a floor servomotor 230, mezzanine servomotors 231, 232, a rear channel X-axis servomotor 233, a front channel X-axis servomotor 234, channel lift servomotor 235, a puller X-axis registration servomotor 236, a puller servomotor 237, an edge clamp servomotor 238, a shelf servomotor 239, a leading-edge clamp servomotor 240, an eject pinch roller servomotor 241, a stapler servomotor 242, an mid-page clamp servomotor 243, a trailing-edge clamp servomotor 244, a diverter servomotor 245, and similar.

The servos may control linear and rotational movement and positioning of various components of the finisher 200 along or about X, Y, and Z axes. For example, the stapler 206 may be actuated to move on the Y axis, the channels 220A, 2203 may be actuated to move on the X and Z axes, the mezzanines 215, 216 may be actuated to move on the X axis, the floor 224 may be actuated to move in on the X and Y axes, the leading-edge clamps 209 may be actuated to move along the Z axis, and the shelf 226 may be actuated to rotate about the X axis. Actuation of the various components of the finisher 200 realizes the finishing operations provided by the finisher 200.

The finisher 200 may further include sensors. For example, the finisher 200 may include a channel mezzanine sensor 246, a channel X-axis registration sensor 247, a bin full sensor 248, a rear puller home sensor 249, a front puller home sensor 250, a puller entry sensor 251, an eject sensor 252, stapler sensors 253 (e.g., a stapler servomotor home sensor, a low staples sensor, an out-of-staples sensor, and a stapler carriage door sensor), a media edge sensor, and similar. The sensors may be used to realize the finishing operations provided by the finisher 200.

The sensors may sense print media along the media path P, detect jamming of print target in the finisher 200, determine if the stapler 206 is positioned correctly and its path is clear, check clamps 207, 209, 214, 222 to determine if they are in the raised position, detect if clamps 207, 209, 214, 222 are engaged with each other, check the range of motion of the X-plane and Z-direction channels 220A, 220B, and determine positions of mezzanines 215, 216. The sensors may be positioned to directly sense the presence or absence of print media at any number of points along the path P. The sensors may sense a leading edge, a trailing edge, or both such edges of the print target. The sensors may include, for example, an electromechanical switch, a Hall effect sensor, an optical sensor, a photodiode, a reflective sensor, or the like, and may be positioned to sense the contact or proximity of a print medium.

A sensor may be integrated into a servomotor.

In an example operation, a document stack or copy may be assembled on the mezzanines 215, 216. After a sheet of print target is registered, the sheet may be clamped to the mezzanines 215, 216. When accumulation of the copy is complete, the mezzanines 215, 216 may transport the stack to the stapler 206 for stapling, After the copy is stapled, the mezzanines 215, 216 may transport the finished copy to a drop position. The copy may be clamped by the leading-edge clamps 209 and both mezzanines 215, 216 may be moved outwards away from the copy, dropping it onto the output floor. The channels 220 may act as paper guide surfaces for the transport of a sheet by the pullers 218. The channel X-axis registration sensor 247 may be used to establish X-axis alignment of each sheet during the accumulation of a stack. The pullers 218 may grip the leading edge of each sheet and pull the sheet to X and Y alignment positions. The edge clamps 207, 209 may be moved along the Z-axis down to the edge of a sheet to control sheet curl, and may be moved to specific locations based on sheet size and orientation.

Any of the servomotors of the finisher 200 may be controlled according to a plurality of initialization sequences including a full initialization sequence and a short initialization sequence. The servomotors and the sensors of the finisher 200 may provide positional information to a processor or finishing line controller that executes instructions to select an initialization sequence based on whether or not the finisher 200 is sufficiently close to a ready state upon power on after partial power down.

The instructions to select an initialization sequence may cause a number of events to happen, such as automatic ejection of jammed print media in response to a signal received from a sensor indicative of a jam at the finisher 200, relocation of a number of components to their home positions, raising of clamps 207, 209, 214, 222 and other functions, depending on the determination as to the state of the finisher 200. A detailed example of a full initialization sequence and a short initialization sequence for the finisher 200 is given below.

Figure 4:
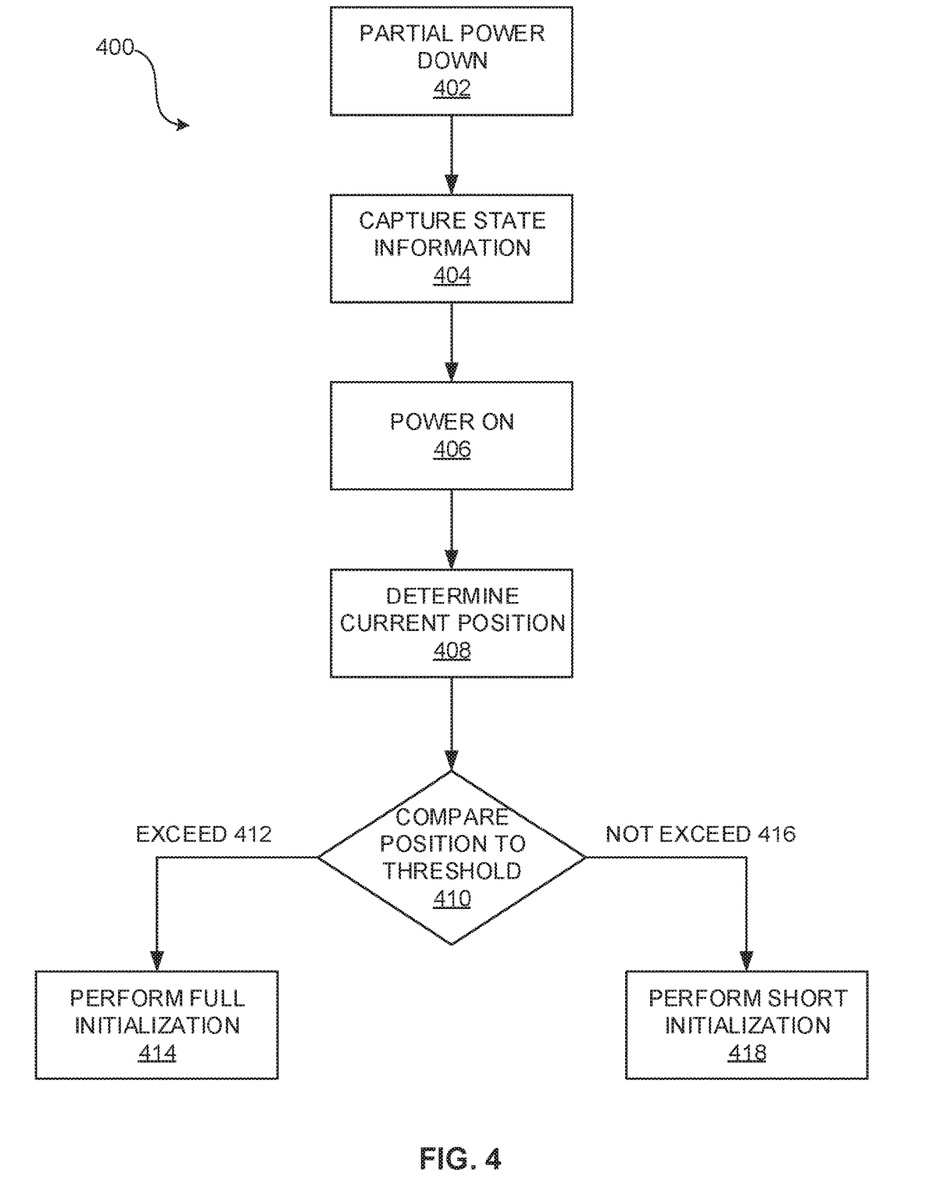
FIG. 4 is a flowchart of an example process to select a full initialization sequence or a short initialization sequence.

FIG. 4 shows an example process 400 to select an initialization sequence, such as a full initialization sequence and a short initialization sequence. The process 400 may be used with any of the apparatuses and print devices described herein. The process 400 may be implemented with executable instructions to be executed by a processor.

At block 402, the apparatus is put into a partial power down state. This may occur without user input after a duration of no printing operations. For example, a sleep state may be entered after several minutes without a print job. Various components of the apparatus may be provided with full, some, or no power in the partial power down state. Further, various components of the apparatus may be susceptible to various degrees of external manipulation by, for example, a user of a printer. It may be by design that some components of the apparatus are intended to be manipulated by the user (e.g., to clear a paper jam), while others are not.

At block 404, state information of a component of the apparatus is captured. Capturing state information includes determining a position of a component of the apparatus and storing the position in non-volatile memory. A sensor may be used to determine the position of the component. Capturing state information may further include storing calibration data or an operational variable of the component in non-volatile memory.

At block 406, the apparatus is powered on. This may include reception of a signal indicative of power on of the apparatus. Such a signal may indicate a printer receiving a print job or a user pressing a power button, for example.

At block 408, a current position of the component of the apparatus is determined. The same sensor may be used as in block 404.

At block 410, the current position of the apparatus component is compared to the position measured prior to partial power down. A difference between the before and after positions may be compared to a threshold. If the threshold is exceeded 412, then the position of the apparatus component is not as expected and a full initialization may be performed, at block 414. If the threshold is not exceeded 416, then the position of the apparatus component is as expected and a short initialization may be performed, at block 418, to save time and potentially reduce noise. During the short initialization, captured state information from block 404 may be used.

During the full initialization sequence, components that are more susceptible to external manipulation and components that are less susceptible to external manipulation are initialized. In the example of a printer, components that are more susceptible to external manipulation include components that a user may be instructed to manually actuate in case of a print media jam, such as a media support. Components that are less susceptible to external manipulation include components that are difficult or unlikely to be manually actuated by the user. Full initialization may include homing of all servos with range of motion and torque checks where appropriate to ensure full readiness. Full initialization may initialize all components of the apparatus. Full initialization may be used after full power down, as a wide range of external physical manipulations may have occurred, such as user movement of components, moving of the apparatus from one location to another, a prolonged duration without use, and similar.

During the short initialization sequence, the locations of the components that are more susceptible to external manipulation are verified. The apparatus may refrain from initializing components that are less susceptible to external manipulation. Previously established calibration data may be reused. As such, initialization time and accompanying sound emissions may be reduced. The short initialization sequence may terminate and transition to the full initiation sequence if the location of a component cannot be verified.

Figure 5:
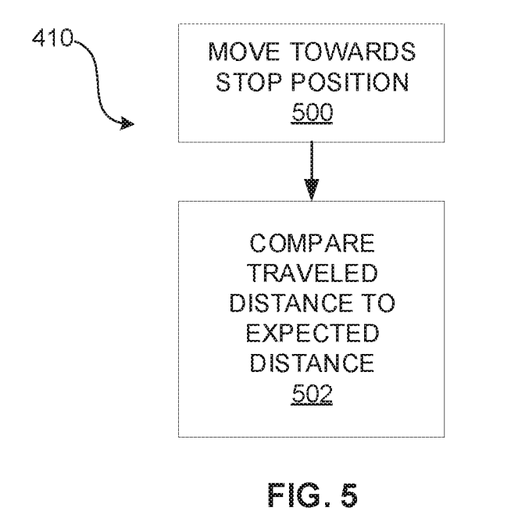
FIG. 5 is a flowchart of an example process to determine whether a position of an apparatus component is within the threshold so that a short initialization sequence may be selected.

FIG. 5 shows an example process to determine whether the position of an apparatus component is within the threshold. The process may be used with any of the apparatuses and print devices described herein and may be used at block 410 in the process 400 of FIG. 4. The process may be implemented with executable instructions to be executed by a processor.

At block 500, a servo connected to a mechanism of an apparatus component moves the connected mechanism from its position at power on towards a stop position. The stop position may provide a physical barrier to movement, such that the servo stalls at the stop position. A sensor may be used to detect the mechanism at the stop position, the servo may detect resistance to movement at the stop position, or a similar technique may be used.

At block 502, a distance traveled for the mechanism to arrive at the stop position is compared to an expected distance to be traveled to the stop position. The expected distance may be small, for example, a few millimeters. The expected distance to be traveled in this example corresponds to a distance between a ready position, at which the mechanism is ready to operate, and the stop position. As such, the distance actually traveled from the starting position at power on to the stop position is compared to the distance expected if the starting position is actually the ready position. Since the stop position is known, this comparison is equivalent to comparing the starting position to the ready position.

A threshold may be used to compare the measured distance traveled to the expected distance. If the measured distance traveled fails to match the expected distance within the threshold, then it is determined that the threshold is exceeded.

Figure 6:
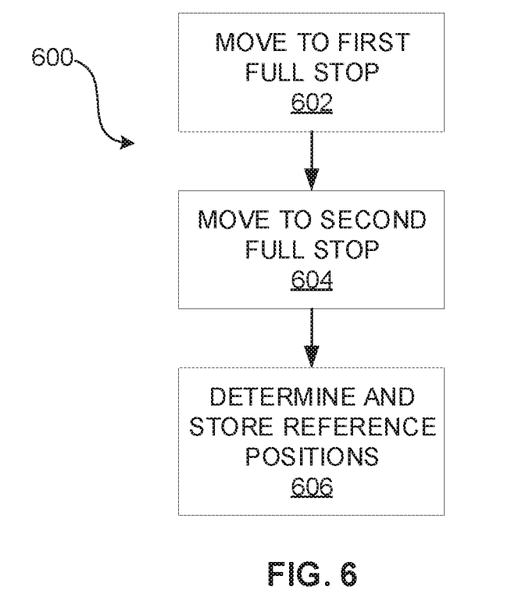
FIG. 6 is a flowchart of an example process to perform a calibration to determine reference positions for a mechanism to use with a short initialization sequence.

FIG. 6 shows an example process 600 for performing a calibration to determine reference positions for a mechanism to use with a short initialization sequence. The process 600 may be used with any of the apparatuses and print devices described herein and may be used prior to block 418 described elsewhere herein. The process 600 may be implemented with executable instructions to be executed by a processor.

At block 602, a servo connected to a mechanism of an apparatus component moves the mechanism in a first direction until a first full stop. Then, at block 604, the servo moves the connected mechanism in a second direction until a second full stop. A full stop may be a position that provides a physical barrier to movement, such that the servo stalls. A sensor may be used to detect full stop, the servo may detect resistance to movement as a full stop, or a similar technique may be used.

At block 606, a plurality of reference positions for the mechanism and the servo are determined based on the first full stop and the second full stop. The plurality of reference positions may be stored as calibration data in non-volatile memory. One of the plurality of reference positions may be a ready position for the mechanism. As such, process 600 may be considered a characterization of an interaction of a plurality of movable components and connected servos.

The plurality of reference positions may be fetched and used to enable performance of the short initialization sequence responsive to a determination that the apparatus component is within the threshold of the expected position. This may occur at block 418 described elsewhere herein.

Figure 7:
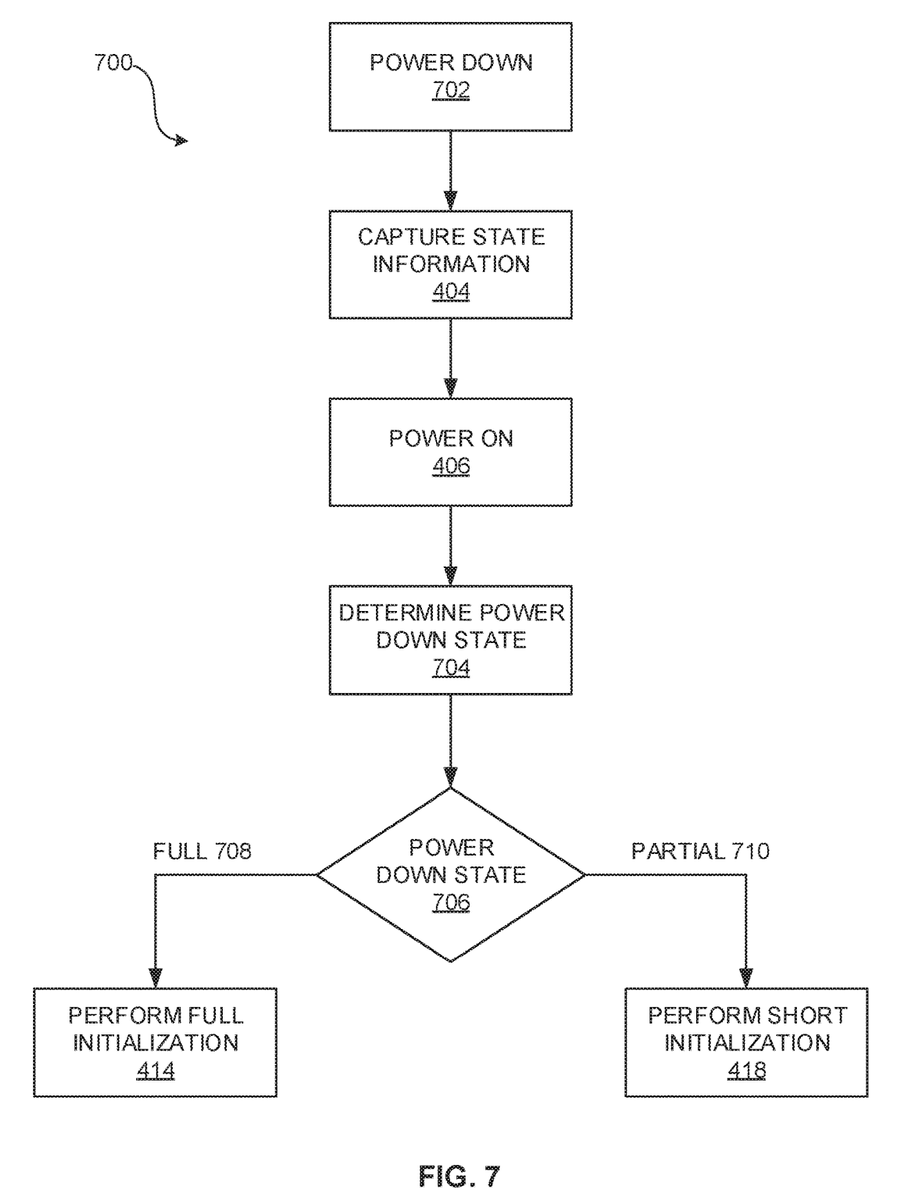
FIG. 7 is a flowchart of another example process to select a full initialization sequence or a short initialization sequence.

FIG. 7 shows an example process 700 to select an initialization sequence, such as a full initialization sequence and a short initialization sequence. The process 700 may be used with any of the apparatuses and print devices described herein. The process 700 may be implemented with executable instructions to be executed by a processor. The process 700 is similar to the process 400 and only differences are described in detail.

At block 702, the apparatus receives a signal corresponding to a power down state The power down state may be a partial power down state, a full power down state, or similar.

At block 404, in response to reception of a signal corresponding to a power down state, state information is captured for a plurality of movable components and connected servos of the apparatus. The plurality of movable components and connected servos may include first and second movable components and first and second servos. The first movable component and second movable component may have respective positions, calibration data, operational variables, and similar.

At a later time, at block 406, the apparatus receives a signal indicative of power on.

Then, upon reception of a signal indicative of power on, at block 704, it is determined whether the power down state, entered at block 702, corresponds to the full power down state 708 or the partial power down state 710.

In response to determination that the power down state corresponds to the partial power down state, at block 706, then the short initialization sequence is performed for the plurality of movable components and connected servos, at block 418. During the short initialization, captured state information from block 404 may be used. For example, calibration data may be fetched from non-volatile memory and used as a characterization of an interaction of the plurality of movable components and connected servos.

In response to determination that the power down state corresponds to the full power down state, at block 706, then the full initialization sequence is performed for the plurality of movable components and connected servos, at block 414.

In addition, in some examples, block 706 triggers the full initialization sequence in response to completion of a user intervention to clear a jam of print media from the apparatus. That is, the full initialization sequence may be performed after a jam, irrespective of the power down state.

Further, the short initialization sequence may terminate and the full initiation sequence may be initiated if the location of a component cannot be verified.

With reference back to FIGS. 2 and 3, a full initialization sequence may be performed for a finisher 200 when the finisher 200 is powered on from full power down state or is recovering from a jam. An example full initialization sequence discovers the state of the components of the finisher 200, drops a stack of print media if needed, and then initializes all components. The full initialization sequence determines home positions for relevant components and performs calibrations to be used with the components during a subsequent job.

An example full initialization sequence of the finisher 200 is as follows:

1. Various sensors are checked and initialization of servos commences as follows:

a. Bin correction factors are restored and the output bin is moved to its home position;

b. A stapler home sensor 253 is checked and, if needed, the stapler 206 is moved to its home position;

c. The front and rear trailing-edge clamps 207B, 207A, mid-page clamp 222, leading edge clamp 209 (which holds the media edge), and shelf 226 clamp are raised;

d. The paper path P sensors are checked and the paper path P is cleared;

e. The puller entry sensor 251 and servo 237 are initialized;

2. The bar clamps 214 and trailing edge clamps 207A, 207B, if needed, are disengaged from the mezzanines 215, 216. In some circumstances, the bar clamps 214 and trailing edge clamps 207A, 207B become engaged preventing the movement of the mezzanines 215, 216. If such a situation is detected, the following events occur:

a. The front and rear mezzanine 215, 216 encoders are tested to determine if the mezzanines 215, 216 are connected; and b. If an entanglement is detected, the bar clamps 214 or trailing-edge clamps 207A, 207B are raised and the mezzanine 215, 216 is repositioned until the bar clamps 214 and trailing-edge clamps 207A, 207B are freed from each another.

3. The pullers 218A, 218B are controlled to pull any unwanted media forward off the pullers 218A, 218B, dropping the media to the media stack.

4. The mezzanines 215, 216 are checked for leftover media, and if present, the stapler 206 path is cleared, and the stapler 206 is moved to its home position or remains in its current position if its current position is its recorded home position. The mezzanines 215, 216 are opened fully, the shelf 226 is initialized and the media stack is dropped. At this point, all leftover media has been dropped into the output bin and no media should be held by any other finisher component.

5. The media accumulator components, such as channels 220A, 220B and bar clamps 214, are initialized and positioned:

a. The range of motion of the channels 220A, 220B in the X-plane and the Z-axis is checked and measured. Based on such measurements, the channels 220A, 220B are initialized accordingly;

b. The range of motion of bar clamps 214 is checked;

c. The bar clamps 214 are initialized;

d. Front and rear channels 220B, 220A are initialized and home positions set;

e. Range of motion (in X-axis and Z-axis) of the front and rear channels 220B, 220A is checked;

f. The state of the pullers 218A, 218B is measured and based on such measurement the pullers 218A, 218B are calibrated and initialized accordingly;

g. The leading-edge clamp 209 is initialized;

h. Mezzanine 215, 216 home positions are found;

i. Mezzanines 215, 216 and channels 220A, 220B are moved out of the stapler path in anticipation of initializing the stapler 206;

j. The X-axis registration mechanism 254, which aligns a page being accumulated to a stack of pages already accumulated, is initialized;

k. The stapler 206 is initialized;

l. The rear mezzanine 216 gap to the stapler 206 is initialized;

m. The mid-page clamp 222 is initialized;

n. The mezzanine-to-channel position is calibrated;

o. The mid-page clamp 222 and rear trailing-edge clamp 207A to mezzanine 216 gaps are calibrated;

p. The mezzanines 215, 216 are initialized;

q. The stapler 206, leading-edge clamps 209, and mid-page clamp 222 are moved to their job-ready positions;

r. The channels 220A, 220B and bar clamps 214 are moved to their job ready positions;

s. The gap between the front trailing-edge clamp 207B and the mezzanine 215 is calibrated;

t. The mezzanines 215, 216 are moved to their job ready positions; and u. The holds and push actions on the channels 220A, 220B, bar clamps 214, and trailing-edge clamps 207A, 207B are released.

At this point, the full initialization of the finisher 200 is complete. State information for the various components may be recorded in non-volatile memory for the next power down event. The apparatus is ready to receive and process a new print job.

An example short initialization sequence for the finisher 200 is as follows:

1. Recorded calibrations and operational variables are restored from non-volatile memory.

2. Bin correction factors are restored.

3. Sensor states for media edge, puller entry, and front and rear puller 218A, 218B home positions are checked.

4. The output bin is moved to its home position.

5. The stapler 206 is prepared for use.

6. The stapler servo 242 is set to its recorded position.

7. The puller servo 237 is set to its recorded position.

8. The channel servos 233, 234, 235 are set to their recorded positions.

9. The X-axis registration mechanism 254 is moved to its home position.

10. Sensor readings are compared to determine that the various components are in their expected states and positions, such as their home or ready positions. This is conducted by moving components as listed below a distance small to where each component is expected to contact and stall against a hard stop:

a. Verify that trading-edge clamps 207A, 207B are in their expected raised position;

b. Verify that the mid-page clamp 222 is in its expected raised position;

c. Verify that the bar clamps 214 are in their expected raised positions;

d. Test front and rear mezzanine 215, 216 encoders;

e. Verify that the mezzanines 215, 216 are in their expected positions;

f. Verify that the shelf 226 is in its expected raised position.

11. Then, the following components are prepared to be ready to receive a new print job as follows:

a. The pullers 218A, 218B are positioned to their home positions;

b. The leading-edge clamp 209 is initialized;

c. The channels 220A, 220B are moved to verify that the channels 220A, 220B are positioned at or near their expected positions;

d. The channels 220A, 220B and bar clamps 214 are moved to job-ready positions; and e. The holds and push actions on the channels 220A, 220B, bar clamps 214, and trailing-edge clamps 207A, 207B are released.

At this point, the short initialization sequence of the finisher 200 is complete. State information for the various components may be recorded in non-volatile memory for the next power down event. The apparatus is ready to receive and process a new print job.

During the short initialization sequence, if a component is not verified to be in its expected position, then the short initialization sequence may be terminated, and the full initialization sequence may be performed to fully ready the apparatus.

The example short initialization sequence discussed above may be quieter and may move components relatively little compared to the example full initialization sequence. In some examples, the short initialization sequence may take about 6 or 7 seconds to bring the finisher 200 to a ready state and the full initialization sequence may take about 55 seconds to move the components through their full ranges of motion and perform measurement and calibration.

Figure 8:
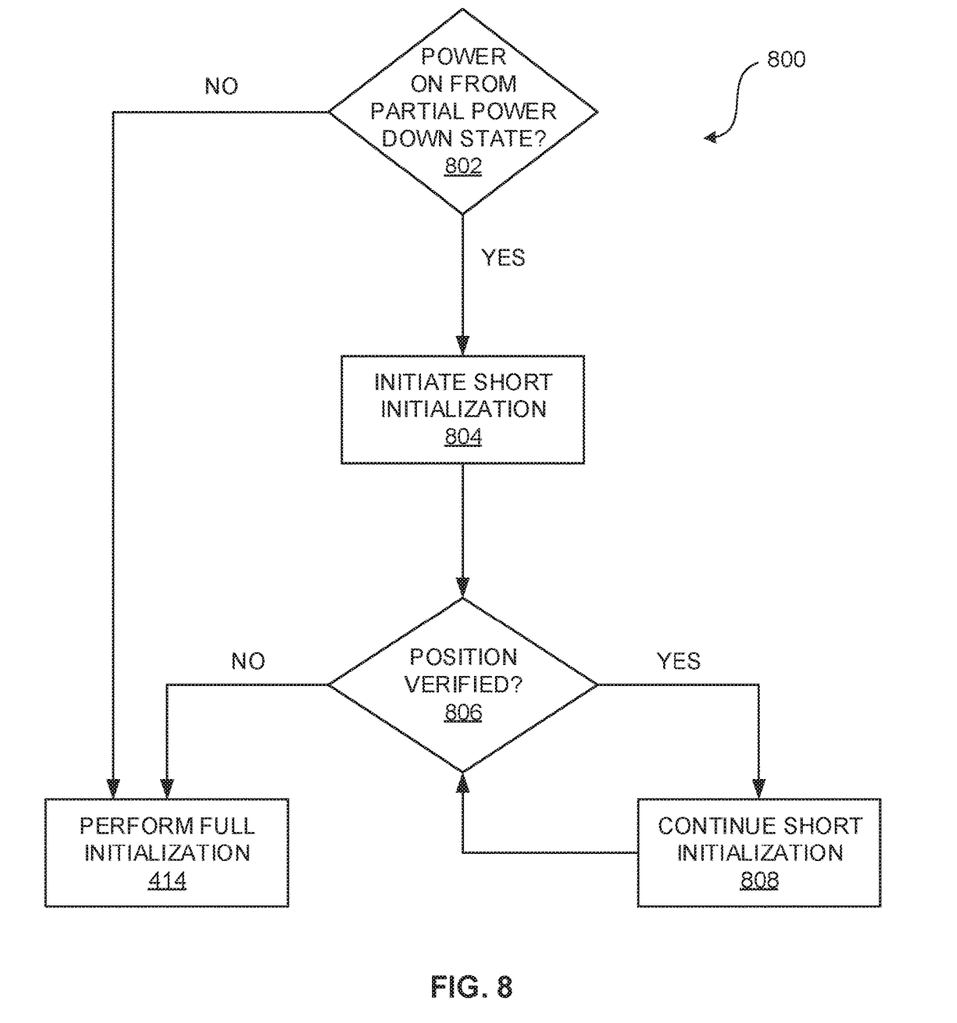
FIG. 8 is a flowchart of an example process to select a full initialization sequence or a short initialization sequence, with termination of the short initialization sequence upon a failed verification.

FIG. 8 shows an example process 800 to select an initialization sequence; such as a full initialization sequence and a short initialization sequence; and to transition from the short initialization sequence to the full initialization sequence when a position verification fails. The process 800 may be used with any of the apparatuses and print devices described herein. The process 800 may be implemented with executable instructions to be executed by a processor.

At block 802, it is determined whether an apparatus is powered on from a partial power down state. This may occur, for example, in response to a new print job being received when the apparatus is in a sleep state.

If the apparatus is powered on from a partial power down state, then the short initialization sequence is initiated, at block 804. In other situations, such as power on from full power down or after a user has manually cleared a jam, the full initialization sequence is performed at block 414.

During the short initialization sequence, a position of a movable component of the apparatus may be verified, at block 806. Verification may be performed instead of calibration or other action that may be performed by the full initialization sequence. If the movable component is verified to be at an expected position, then the short initialization sequence is continued at block 808 to, for example, verify a position of another movable component, perform a calibration of another movable component, move another movable component to a ready position, and similar.

If the position of the movable component fails to be verified, then the full initialization sequence is performed, at block 414. Hence, the short initialization sequence may yield to the full initialization sequence if it is determined that the short initialization sequence is not appropriate.

Referring back to the example short initialization sequence discussed above with respect to the finisher 200, the checks and verifications listed may be performed at block 806 as conditions for continuing the short initialization sequence.

The verification check defined by blocks 806, 808 may be used to supplement blocks 408, 410, 418 of other processes described herein. That is, verification of a position may be a condition to initiating, continuing, or both initiating and continuing the short initialization sequence. As such, if a verification fails, the short initialization sequence may be terminated and the full initialization sequence initiated.

Figure 9:
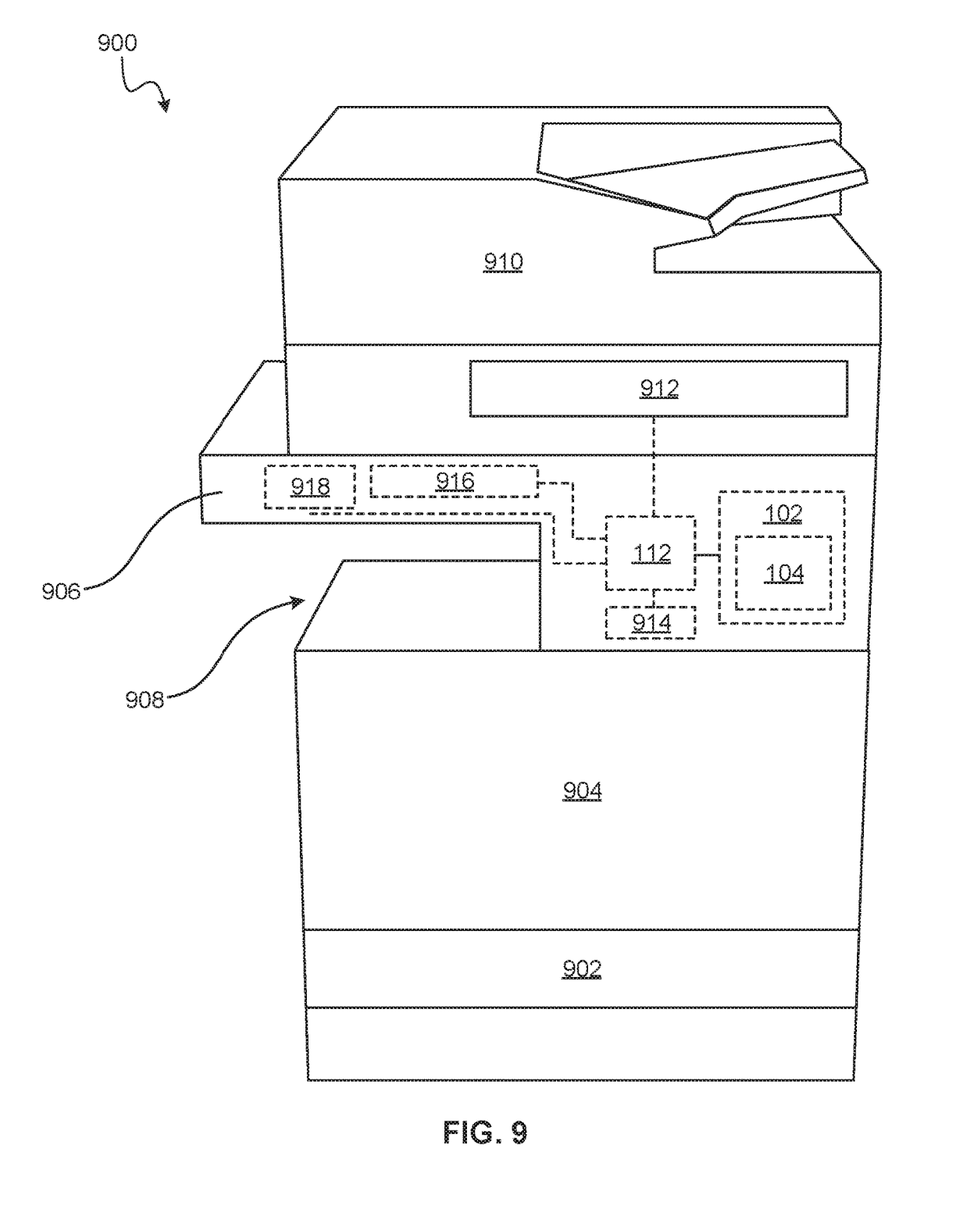
FIG. 9 is a perspective diagram of an example print device that may select an initialization sequence.

FIG. 9 shows an example print device 900. The print device 900 may include any of the apparatuses or devices discussed herein and may perform any of the processes discussed herein.

The print device 900 may include a paper tray 902, a print engine 904, a finisher 906, an output bin 908, a document feeder 910, and a user interface 912. The print device 900 may be a multi-function device that may provide functions in addition to printing, such as scanning, copying, faxing, and the like.

The paper tray 902 may store paper or other print medium for feeding into the print engine 904. The print engine 904 may include components to print documents. The print engine 904 may provide for inkjet printing, laser printing, or similar. The finisher 906 may be coupled to an output of the print engine 904 to receive printed pages from the print engine 904. The finisher 906 may perform any number of finishing operations on printed pages that flow along a print-medium path within the finisher 906. The finisher 906 may output documents to the output bin 908 for retrieval by a user. The output bin 908 may include a tray or floor at a lower end of the finisher 906 or below the finisher 906. The feeder 910 may be used to receive pages of documents into the print device 900. An image capture device may be integrated with the feeder 910. A window, which may be a glass platen, may be situated below the feeder 910 to allow for capture of images of documents provided to the feeder 910. The user interface 912 may include a keyboard, touchscreen, display device, and similar device to receive input from the user to control the print device 900 and to output information to a user in human-perceptible form, such as by rendering a graphical user interface (GUI). The user interface 912 may include a power button to control the power state of the print device 900. For example, a power button may allow the user to trigger a signal to transition the print device 900 from a full or partial power down state to a power on state.

The print device 900 includes a processor 112 and non-transitory computer-readable medium or memory 102 coupled to the processor 112. The processor 112 and memory 102 may cooperate to execute instructions 104 that may be stored in the memory 102. The processor 112 may be coupled to the user interface 912 to receive input from the user and provide information to the user. The processor 112 may be coupled to the finisher 906 to control operations of the finisher 906. The processor 112 may further be coupled to the print engine 904 and other components of the print device 900 to control same. The processor 112 may be a central or main processor of the print device 900, may be a subordinate processor, such as a finishing line controller that controls the finisher 906, or may be a combination of such.

The print device 900 may further include a communications interface 914 connected to the processor 112. The communications interface 914 allows the print device 900 to communicate with a computer or computer network, which may provide documents to print. Example communications interfaces include a network adaptor (e.g., Ethernet, etc.) and related driver, a Universal Serial Bus (USB) port and related driver, and similar. Reception of a document to print at the communications interface 914, i.e., a new print job, may trigger a signal to transition the print device 900 from a full or partial power down state to a power on state.

The print device 900 includes a first mechanism movable by a first servo, indicated schematically at 916. For example, the first mechanism 916 may correspond to media supports, such as mezzanines of the finisher 906, that are to receive print media. In other examples, the first mechanism 916 may correspond to other movable components described elsewhere herein.

The print device 900 includes a second mechanism movable by a second servo, indicated schematically at 918. For example, the second mechanism 918 may correspond to an accessory device, such as a movable stapler device of the finisher 906. In other examples, the second mechanism 918 may correspond to other movable components described elsewhere herein.

The processor 112 is controllably coupled to the first and second mechanisms 916, 918.

The processor 112 may execute the instructions 104 to cause the first mechanism 916 and the second mechanism 918 to perform a calibration, and further to store reference positions of the first mechanism 916 and the second mechanism 918 in memory, such as the memory 102. A calibration for the first mechanism 916 and a separate calibration for the second mechanism 918 may be performed. A characterization of an interaction of a plurality of movable components and connected servos may thus be performed.

The processor 112 may further receive a signal indicative of a transition to a power on state and, in response, verify that the first mechanism 916 is within a threshold of an expected position for the first mechanism 916 and that the second mechanism 918 is within a threshold of an expected position for the second mechanism 918.

In response to determining that both the first mechanism 916 and the second mechanism 918 are within respective thresholds of the respective expected positions, the stored reference positions may be fetched from memory. Accordingly, a new calibration, and related movement of the mechanisms 916, 918, may be avoided.

In response to determining that one or both the first mechanism 916 and the second mechanism 918 are not within respective thresholds, a new calibration may be performed. One or both of the mechanisms 916, 918 may then undergo movement to perform the calibration.

Figure 10:
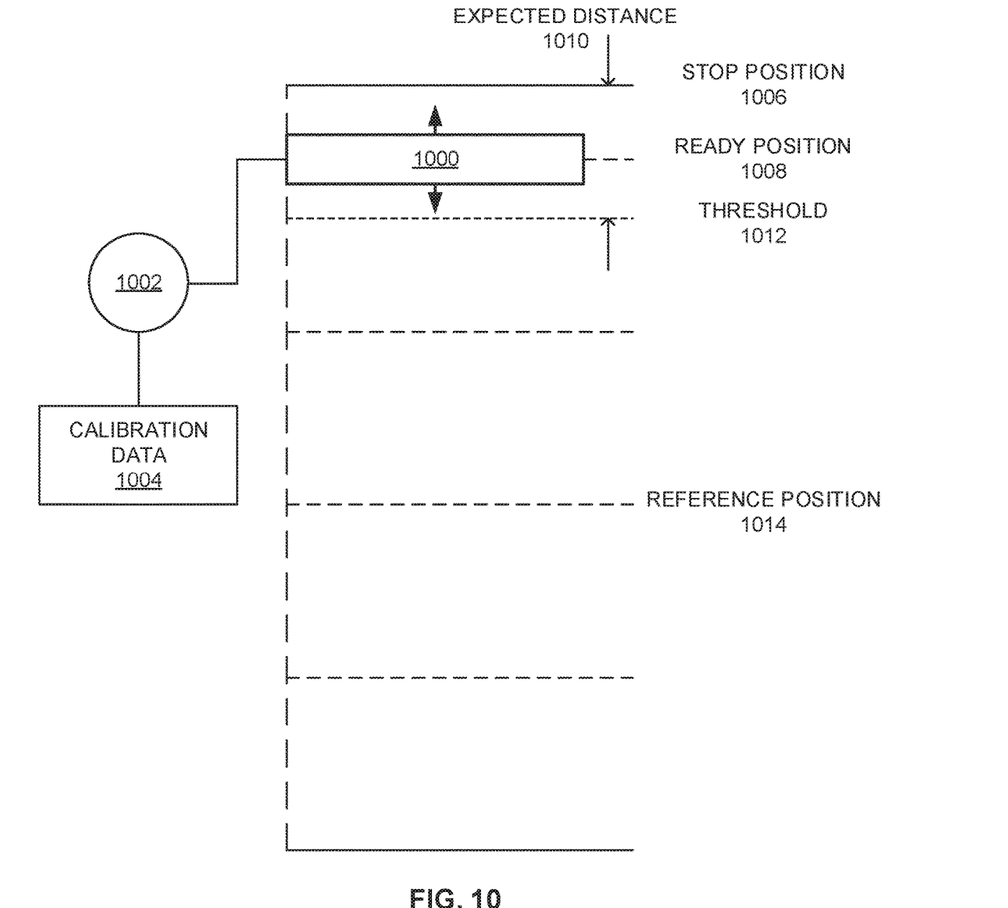
FIG. 10 is a schematic diagram of positions of an example apparatus component relevant to selecting an initialization sequence.

FIG. 10 shows positions of an example apparatus component within its range of motion. The apparatus component includes a mechanism 1000 and a servo 1002 that moves the mechanism 1000 according to calibration data 1004. Example positions include a stop position 1006 that may be used to verify that the mechanism 1000 is at an expected or ready position 1008. The ready position 1008 may be defined as being within an expected distance 1010 of the stop position 1006. The expected distance 1010 may be defined by a threshold 1012. Verification of the mechanism 1000 as being positioned within the expected distance 1010 may be used as a condition for initiating and continuing a short initialization sequence.

The stop position 1006 may also be used during a calibration to obtain the calibration data 1004, which may include a plurality of reference positions 1014.

As should be apparent from the above, a degree of initialization to achieve a ready state for an apparatus, such as a printer, may be selected based on whether current positions of the apparatus are as expected for the ready state. An initialization sequence may be based on a difference between a recorded position of the apparatus and a current position of the apparatus. A short initialization sequence may be used, if determined to be appropriate, to put the apparatus in a ready state in a time efficient manner while at the same time reducing acoustic annoyance to the user. The delay and noise associated with unnecessary initialization of a component already in its ready state may be avoided, and the apparatus may be ready to process a new print job with reduced delay.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. An apparatus comprising:
   a non-transitory computer-readable medium with instructions stored thereon to perform apparatus component initialization sequences, wherein the apparatus component initialization sequences comprise a full initialization sequence and a short initialization sequence; and
   a processor to execute the instructions to:
   capture apparatus component state information;
   determine upon reception of a signal indicative of power on of the apparatus whether a position of an apparatus component is within a threshold of an expected position; and
   perform the short initialization sequence if the position of the apparatus component is within the threshold and using the captured apparatus component state information.

2. The apparatus of claim 1, wherein the captured apparatus component state information comprises information corresponding to servos and mechanisms connected to the servos.

3. The apparatus of claim 2, wherein the mechanisms comprise media supports to receive printed media.

4. The apparatus of claim 2, wherein the mechanisms are movable between a plurality of positions as enabled by the servos.

5. The apparatus of claim 4, wherein the captured apparatus component state information is to correspond to a position of the servos, a position of the mechanisms, or a combination thereof.

6. The apparatus of claim 1, wherein to determine whether the position of the apparatus component is within the threshold comprises execution of the instructions by the processor to:
   cause a servo connected to a mechanism of the apparatus component to move the mechanism towards a stop position; and
   compare a distance traveled for the mechanism to arrive at the stop position with an expected distance to be traveled to the stop position.

7. The apparatus of claim 6, wherein the expected distance to be traveled corresponds to a distance between a ready position and the stop position.

8. The apparatus of claim 1, wherein the processor is further to:
   perform a full initialization sequence upon a determination that the signal indicative of power on of the apparatus corresponds to a signal indicative of power on from a full power down state of the apparatus.

9. The apparatus of claim 8, wherein the processor is further to:
   cause a servo connected to a mechanism of the apparatus component to move in a first direction until a first full stop and move in a second direction until a second full stop; and
   determine a plurality of reference positions for the mechanism and the servo based on the first full stop and the second full stop, wherein one of the plurality of reference positions comprises a ready position for the mechanism.

10. The apparatus of claim 9, wherein the processor is further to store calibration data comprising the plurality of reference positions in a non-volatile memory.

11. The apparatus of claim 10, wherein responsive to a determination that the apparatus component is within the threshold of the expected position, the processor is further to fetch and use the plurality of reference positions to enable performance of the short initialization sequence.

12. A print device comprising:
a plurality of movable components connected to servos;
a processor to:
 capture state information for the plurality of movable components and connected servos in response to reception of a signal corresponding to a power down state;
 determine, upon reception of a signal indicative of power on of the print device, whether the power down state corresponds to a full power down state or a partial power down state; and
 cause the plurality of movable components and connected servos to perform a short initialization sequence in response to determination that the power down state corresponds to a partial power down state, wherein the short initialization sequence is to comprise use of calibration data fetched from the captured state information.

13. The print device of claim 12, wherein the calibration data is to comprise a characterization of an interaction of the plurality of movable components and connected servos.

14. A print device comprising:
a first mechanism movable by a first servo;
a second mechanism movable by a second servo; and
a processor to:
 cause the first mechanism and the second mechanism to perform a calibration; and store reference positions of the first mechanism and the second mechanism in a memory;
 receive a signal indicative of a transition to a power on state;
 cause the first mechanism to move to a first stop position and determine whether the first mechanism is within a threshold of an expected position for the first mechanism;
 cause the second mechanism to move to a second stop position and determine whether the second mechanism is within a threshold of an expected position for the second mechanism;
 responsive to a determination that both the first mechanism and the second mechanism are within respective thresholds of the respective expected positions; fetch the stored reference positions; and
 responsive to a determination that one or both the first mechanism and the second mechanism are not within respective thresholds, cause the first mechanism and the second mechanism to perform the calibration.

15. The print device of claim 14, wherein the first mechanism corresponds to media supports to receive print media and the second mechanism corresponds to a movable stapler device.

\* \* \* \* \*

UNITED STATES PATENT AND TRADEMARK OFFICE
CERTIFICATE OF CORRECTION

PATENT NO.         : 10,432,816 B1
APPLICATION NO.    : 16/104690
DATED              : October 1, 2019
INVENTOR(S)        : Stuart Scofield et al.

Page 1 of 1

It is certified that error appears in the above-identified patent and that said Letters Patent is hereby corrected as shown below:

On the Title Page

Item (57), Abstract, in Column 2, Line 5, delete "sequence," and insert -- sequence. --, therefor.

In the Claims

In Column 16, Line 6, in Claim 14, delete "calibration;" and insert -- calibration, --, therefor.

In Column 16, Line 22, in Claim 14, delete "positions;" and insert -- positions, --, therefor.

Signed and Sealed this
Seventeenth Day of March, 2020

Andrei Iancu
*Director of the United States Patent and Trademark Office*